Patented Mar. 4, 1930

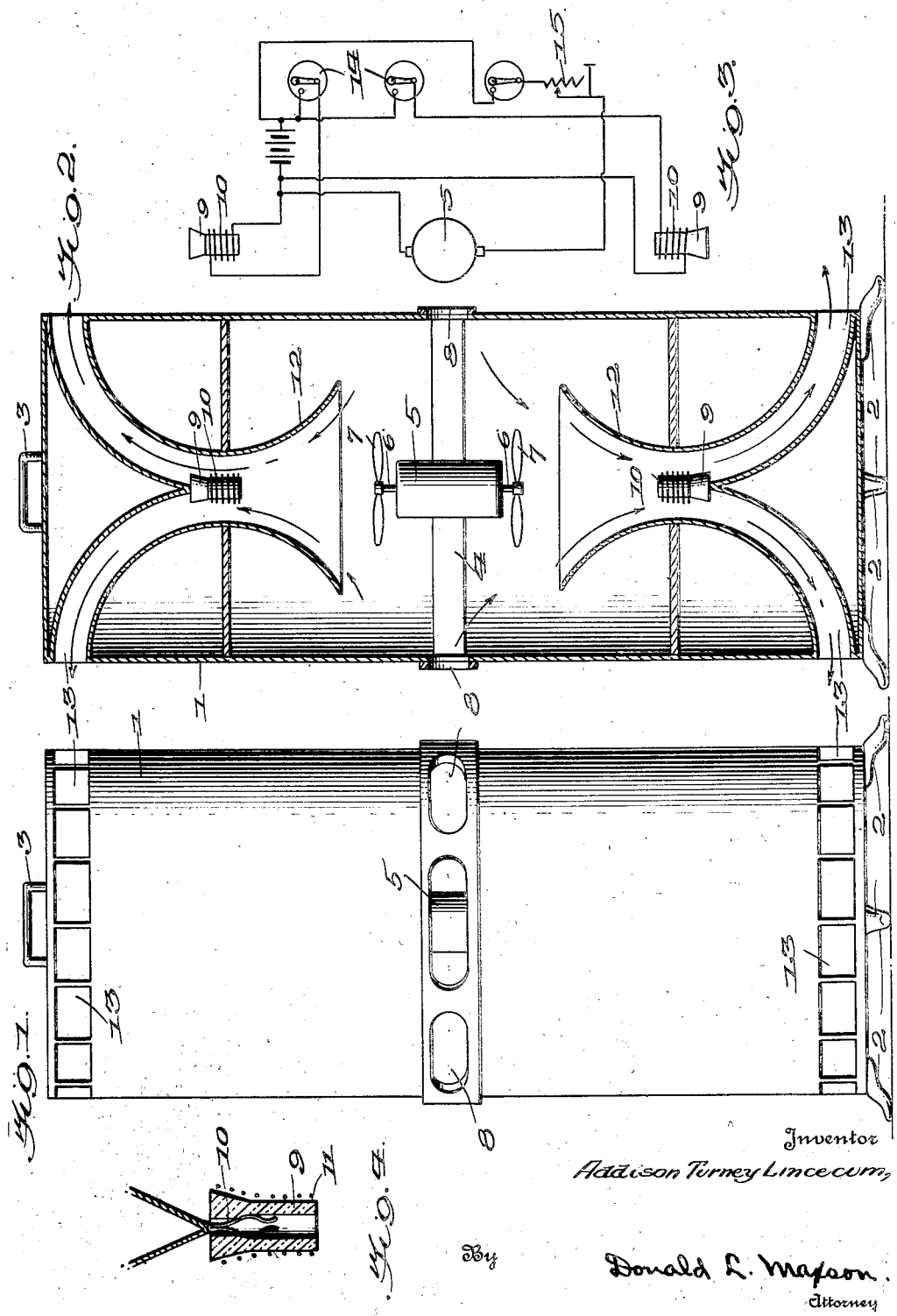

1,749,039

UNITED STATES PATENT OFFICE

ADDISON TURNEY LINCECUM, OF EL CAMPO, TEXAS

PORTABLE ELECTRIC AIR HEATER

Application filed March 20, 1929. Serial No. 348,595.

This invention relates to improvements in heaters, and more particularly to an improved form of electric heater which may be placed in a room to heat and circulate air through the same.

An object of the invention is to provide an improved portable electric air heater which will be so constructed that air will be drawn into the central portion of the heater, and after being heated will be discharged from a plurality of ports adjacent the top and bottom of the said heater.

A further object of the invention is to provide an improved portable electric air heater which will heat air and circulate the same through a room, and which will be provided with suitable means whereby the amount of heated air circulated may be increased or decreased according to the desire of the person operating the heater.

A still further object of the invention is to provide an improved portable electric air heater which will be highly efficient in use and quite inexpensive to manufacture.

Other objects will appear as the description proceeds.

In the accompanying drawings which form a part of my application.

Figure 1 is a side elevation of my improved portable electric air heater;

Figure 2 is a sectional view taken on the line 2—2 of Figure 1, and

Figure 3 is a wiring diagram of the circuits used in the heater, showing the switches and rheostat for controlling the same.

Figure 4 is a detail of the heating element and supporting means.

Like characters of reference are used throughout the following specification and the accompanying drawings to designate corresponding parts.

My improved portable electric heater comprises a substantially round casing 1, which is supported upon suitable legs 2, and is provided with a handle 3 at the top thereof whereby the same may easily and readily be carried from place to place.

A spider or frame 4 is mounted across the central portion of the casing 1, and is adapted to support an electric motor 5 in vertical position within the casing. Any suitable means may be employed for securing the motor to the frame, in order that the same may be removed when desired. A motor shaft 6 extends through the motor 5, and supports at either end thereof, the fans or propellers 7, which are adapted to draw in the air through the enlarged intake passages 8, disposed in circular arrangement about the center of the casing.

The air deflecting cones 9 are arranged at either end of the casing 1 and are so positioned that their points extend to within a short distance from the fans or propellers 7. Suitable clips 10 are formed on the points of the cones 9 and removably and detachably support the heating elements 11. Guard plates 12 are secured to the inner wall of the casing 1, and extend in parallel relation and in spaced relation to the annular surfaces of the cones 9, whereby positive paths will be formed for the air after the same has been heated by coming in contact with the heating elements 11. A plurality of outlets 13 will be formed adjacent the upper and lower ends of the casing 1, at the outer ends of the paths formed by the cooperating walls of the cones and guard plates.

Suitable switches 14 will be positioned on the outer surface of the casing 1 to turn on and off the electricity to the heating elements 11, while a rheostat 15 will be placed adjacent the switches to regulate the speed of the motor, thereby selectively regulating the amount of air which is heated and circulated.

The wiring diagram for the heating elements and the rheostat controlled motor has been illustrated in detail in Figure 3 of the drawings, and since the same discloses circuits well known to any electrician, it is believed that no further explanation of the same is necessary.

From the foregoing description, it will be apparent that the portable electric heater may be carried from room to room or from place to place, as the same is quite compact and is of little weight. When it is desired to heat a room, it is only necessary to close the switches to the heating elements and start the electric motor, whereupon the air from the room will be drawn into the central part of the casing, and will be directed over the heating elements where it will be heated, after which, it will be discharged at considerable velocity out of the outlet ports at the top and bottom of the casing. In this manner, the air in a room may quickly be heated to the desired temperature, and the amount of heated air circulated may readily be varied by speeding up or slowing down the motor by use of the rheostat.

It will be understood that the heating elements and motor will be connected with any suitable source of electric supply, as for example, a floor plug connected to the house wiring system.

Many minor changes in detail of construction may be resorted to without departure from the spirit of the invention.

Having thus described my invention, what I claim as new and desire to secure by Letters Patent of the United States is:

A portable electric air heater comprising a casing, a motor having fans at its opposite ends positioned at the central portion of said casing, heating elements above and below said motor, cone-shaped air deflecting members in the upper and lower ends of said casing provided with means for supporting said heating elements, and annularly arranged inlet passages disposed at the central portion of said casing and annular outlet passages at the top and bottom of said casing.

In testimony whereof I affix my signature.

ADDISON TURNEY LINCECUM.